United States Patent
Daniels et al.

(10) Patent No.: US 11,312,049 B2
(45) Date of Patent: *Apr. 26, 2022

(54) ADDITIVE MANUFACTURING SYSTEM FOR HALFTONE COLORED 3D OBJECTS

(71) Applicant: Xerox Corporation, Norwalk, CT (US)

(72) Inventors: Marc D. Daniels, Webster, NY (US); Wayne A. Buchar, Bloomfield, NY (US); Roger L. Triplett, Penfield, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 366 days.

This patent is subject to a terminal disclaimer.

(21) Appl. No.: 16/374,185

(22) Filed: Apr. 3, 2019

(65) Prior Publication Data

US 2020/0316832 A1 Oct. 8, 2020

(51) Int. Cl.
*B29C 45/16* (2006.01)
*B33Y 10/00* (2015.01)
(Continued)

(52) U.S. Cl.
CPC .. *B29C 45/1643* (2013.01); *B29K 2995/0021* (2013.01); *B33Y 10/00* (2014.12); *B33Y 30/00* (2014.12); *B33Y 70/00* (2014.12)

(58) Field of Classification Search
CPC ... B29C 64/165; B29C 64/188; B29C 64/205; B29C 64/255; B29C 64/314;
(Continued)

(56) References Cited

U.S. PATENT DOCUMENTS

| 3,473,205 A | 10/1969 | Zocher |
| 3,774,273 A | 11/1973 | Okamoto et al. |

(Continued)

FOREIGN PATENT DOCUMENTS

| EP | 2776233 | 12/2017 |
| WO | WO2014134224 | 9/2014 |

OTHER PUBLICATIONS

Wikipedia (2018). Augmented Reality. Wikipedia, the free encyclopedia. Dec. 6, 2018 from https://en.wikipedia.org/wiki/Augmented_reality.

(Continued)

*Primary Examiner* — Nahida Sultana
(74) *Attorney, Agent, or Firm* — Caesar Rivise, PC

(57) ABSTRACT

A 3D printing system applies colored powders (e.g., primary colors, white, black, cyan, magenta, yellow, fluorescent colors, metallic) in printed polymer layers for forming a colored 3D object. The system may stabilize a powder layer or color sub-layers thereof, for example with one or more of heat, pressure, and/or high-intensity light. On each layer, powders of various colors may be sequentially deposited in a halftone pattern and stabilized, so as to create a part with a specified arrangement of colors throughout its structure. Benefits include more stable color than strategies involving jetting colored fluids. The arrangement of color on the interior of the part could provide functional or traceability benefits for specific applications. The examples allow for depositing a greater quantity of powder on each fiber base or substrate, decreasing the ratio of fiber to powder and increasing production speed.

18 Claims, 4 Drawing Sheets

(51) Int. Cl.
*B33Y 70/00* (2020.01)
*B33Y 30/00* (2015.01)

(58) Field of Classification Search
CPC ... B29C 64/321; B29C 64/386; B29C 64/393; B29C 64/40; B29K 2105/0032; B33Y 10/00; B33Y 40/00; B33Y 50/02
See application file for complete search history.

(56) References Cited

U.S. PATENT DOCUMENTS

| | | | |
|---|---|---|---|
| 5,173,733 A | 12/1992 | Green | |
| 5,943,125 A | 8/1999 | King et al. | |
| 6,377,758 B1 | 4/2002 | OuYang et al. | |
| 7,050,078 B2 | 5/2006 | Dempski | |
| 7,324,081 B2 | 1/2008 | Friedrich et al. | |
| 7,463,149 B2 | 12/2008 | Friedrich et al. | |
| 8,116,585 B2 | 2/2012 | Wu et al. | |
| 8,496,370 B2 | 7/2013 | Hsu | |
| 8,756,894 B2 | 6/2014 | Swartz et al. | |
| 8,786,686 B1 | 7/2014 | Amirparviz | |
| 9,266,287 B2 | 2/2016 | Kautz et al. | |
| 9,393,770 B2 | 7/2016 | Swartz et al. | |
| 9,507,788 B2 | 11/2016 | Pavlov et al. | |
| 9,683,950 B2 | 6/2017 | Sarrazin et al. | |
| 9,740,974 B2 | 8/2017 | Kumar et al. | |
| 9,776,376 B2 | 10/2017 | Swartz et al. | |
| 9,827,754 B2 | 11/2017 | Swartz et al. | |
| 9,833,949 B2 | 12/2017 | Swartz et al. | |
| 10,046,552 B2 | 8/2018 | Swartz et al. | |
| 2002/0133264 A1 | 9/2002 | Maiteh et al. | |
| 2006/0255525 A1 | 11/2006 | Dinatale et al. | |
| 2013/0171431 A1 | 7/2013 | Swartz et al. | |
| 2014/0002557 A1* | 1/2014 | Condello | B41J 11/00214 347/102 |
| 2014/0085620 A1 | 3/2014 | Lobovsky et al. | |
| 2014/0238173 A1 | 8/2014 | Swartz et al. | |
| 2014/0257549 A1 | 9/2014 | Swartz et al. | |
| 2015/0034123 A1 | 2/2015 | Pressacco et al. | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0260261 A1 | 9/2016 | Hsu | |
| 2016/0297142 A1 | 10/2016 | Bheda et al. | |
| 2016/0339645 A1 | 11/2016 | Swartz et al. | |
| 2017/0106586 A1 | 4/2017 | Keoshkerian et al. | |
| 2017/0144426 A1 | 5/2017 | Moore et al. | |
| 2017/0151719 A1 | 6/2017 | Swartz et al. | |
| 2017/0291223 A1 | 10/2017 | Swartz et al. | |
| 2017/0297303 A1 | 10/2017 | Swartz | |
| 2017/0368744 A1 | 12/2017 | Zona et al. | |
| 2018/0008141 A1 | 1/2018 | Krueger | |
| 2018/0022065 A1 | 1/2018 | Swartz et al. | |
| 2018/0072001 A1 | 3/2018 | Swartz et al. | |
| 2018/0141305 A9 | 5/2018 | Swartz et al. | |
| 2018/0264725 A1 | 9/2018 | Swartz et al. | |
| 2018/0264732 A1 | 9/2018 | Swartz et al. | |
| 2018/0311997 A1* | 11/2018 | Triepel | B41F 19/007 |
| 2019/0067077 A1 | 2/2019 | Muramoto | |
| 2020/0307095 A1* | 10/2020 | Daniels | B29C 64/209 |
| 2020/0398481 A1* | 12/2020 | Mantell | B29C 64/205 |
| 2021/0101332 A1* | 4/2021 | Kawanaka | B29C 64/393 |

OTHER PUBLICATIONS

Impossible Objects' CBAM Pilot Project (video), https://www.youtube.com/watch?v=Dn37IXU2K0M, retrieved Dec. 12, 2018.

* cited by examiner

ADDITIVE MANUFACTURING SYSTEM FOR HALFTONE COLORED 3D OBJECTS

FIELD OF DISCLOSURE

This disclosure relates generally to systems and methods for composite-based additive manufacturing, and more particularly, to such process that produce colored composite structures simultaneously.

BACKGROUND

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

The existing method of producing Composite-Based Additive Manufacturing (CBAM) photosculpture objects in color is done using colored wetting fluid that dyes the carbon fiber or other fiber substrate, then a single layer of powder is applied to each substrate layer. The layers are then compressed and heated to create a stack. Then the unwanted excess substrate is removed by sandblasting or chemical methods. This methodology is disclosed in U.S. Pat. No. 9,393,770 B2, entitled "Methods for Photosculpture". As stated from Col. 4 Line 12, "The problem with using the manufacturers ink, in this case HP, is that the ink is water soluble and can bleed, bleach, and run in the support removal process. This problem can be solved in a number of ways including using piezoelectric heads and pigment inks or using pigment based." It would be beneficial to manufacture composite multi-colored structures in an integrated manner during a single processing process.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a printing system for fabricating halftone colored additive manufactured composite structurer. An exemplary printing system includes a substrate material being forwarded through the system in a process direction and a plurality of color additive manufacturing devices. The first color additive manufacturing device is adjacent to the substrate material and includes a first image forming device, a first color powder applicator and a first color powder remover. The first image forming device selectively deposits a first adhering agent in a desired first halftone pattern onto an imaging area of the substrate material. The first color powder applicator applies a first color powder onto the imaging area and the first adhering agent, wherein the first color powder attaches to the substrate material via interaction with the first adhering agent. The first color powder remover remove any of the applied first color powder that does not attach to the substrate material resulting in a first halftone color image on the imaging area. An additional color additive manufacturing device downstream the first color additive manufacturing device in the process direction includes a second image forming device, a second color powder applicator and a second color powder remover. The second image forming device selectively deposits a second adhering agent in a desired second halftone pattern onto the imaging area and the first halftone color image. The second color powder applicator applies a second color powder onto the imaging area and the second adhering agent, the second color powder being different than the first color powder, wherein the second color powder attaches to the substrate material via interaction with the second adhering agent. The second color powder remover removes any of the applied second color powder that does not attach to the substrate material, resulting in a second halftone color image pattern on the imaging area. As a result, the substrate material is printed with the first halftone color image and the second halftone color image to form an aggregate halftone color image at the imaging area.

According to aspects illustrated herein, an exemplary method for fabricating halftone colored additive manufactured composite structures includes forwarding a substrate material in a process direction, selectively depositing a first adhering agent in a desired first halftone pattern onto an imaging area of the substrate material with a first image forming device, applying a first color powder onto the imaging area via a first color powder applicator to attach the first color powder to the substrate material via interaction with the first adhering agent, removing any of the applied first color powder that does not attach to the substrate material with a first color powder remover, the removing resulting in a first halftone color image on the substrate material, selectively depositing a second adhering agent in a desired second halftone pattern onto the imaging area and the first halftone color image with a second image forming device downstream the first color powder remover in the process direction, applying a second color powder onto the imaging area with a second color powder applicator to attach the second color powder to the substrate material via interaction with the second adhering agent, the second color powder being different than the first color powder, and removing any of the applied second color powder that does not attach to the substrate material with a second color powder remover, the removing resulting in a second halftone color image on the imaging area. The first halftone color image and the second halftone color image form an aggregate halftone color image at the imaging area.

According to aspects described herein, a printing system for fabricating halftone colored additive manufactured composite structures. The system includes a substrate material being forwarded through the system in a process direction, a controller and a plurality of color additive manufacturing devices located in serial succession adjacent to the substrate material. Each of the plurality of color additive manufacturing devices may include an image forming device for selectively depositing a dyeless adhering agent in a respective halftone pattern onto an imaging area of the substrate material, a color powder applicator configured to apply a respective color powder onto the substrate material and the adhering agent, wherein the respective color powder attaches to the substrate material via interaction with the adhering agent, the respective color powder applied by each of the color powder applicators having a different color, and a powder remover configured to remove any of the applied respective color powder that does not attach to the substrate material leaving a halftone polymer image of the respective color on the substrate material. The printing system may also include a fuser positioned after each of the plurality of color additive manufacturing devices in the process direction, with each fuser configured to at least partially cure the respective color halftone polymer image added by the preceding color additive manufacturing device sufficient to stabilize the respective color halftone polymer image with any previously added color halftone polymer image on the imaging area of the substrate material. The controller may be in communication with each of the plurality of color additive manufacturing devices to output control signals to control an operation of the respective color additive manufacturing devices. The color polymer images combine as sub-layers to form an aggregate halftone color image at the imaging area.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
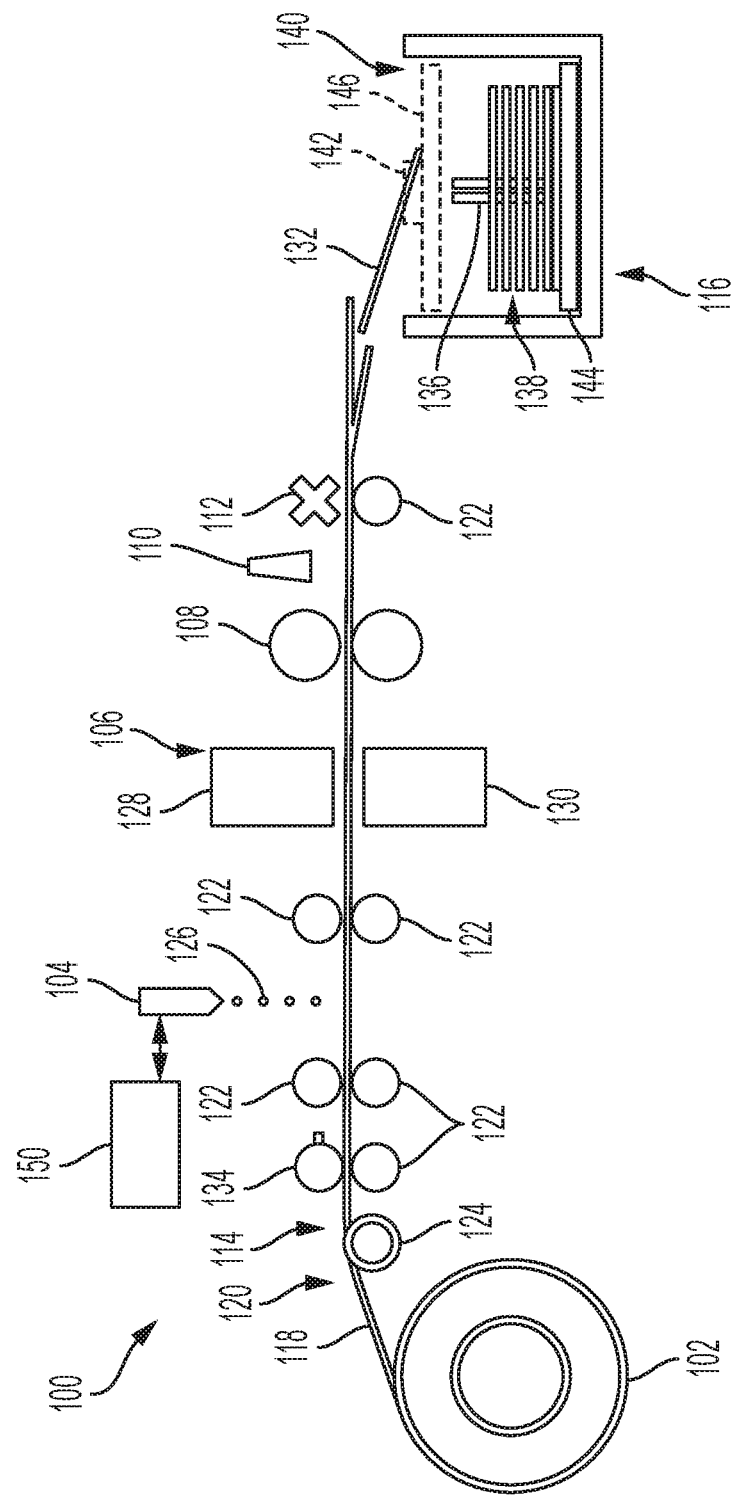
FIG. 1 is a side view of an additive manufacturing system for printing 3D objects in accordance with an example of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term "image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

FIG. 1 is a block diagram of an exemplary AM system 100 for printing 3D objects. The AM system 100 may include components such as a material feeder 102, an image forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a freeform non-uniform rational basis spline (NURBS) program, or the CAD program may be Solid Works®. In the AM system 100, marking material 148 (e.g., powder) (FIG. 4) is selectively deposited by powder subsystem 106 in a physical pattern on a substrate material 118 (or substrate sheets thereof) that corresponds to a "positive image" of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image forming device 104. The substrate material 118 may be transferred to the image forming device 104 via the transfer subsystem 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image forming device 104, the powder subsystem 106, the fuser 108, the sensor 110, and then be cut by the cutter 112 into single sheets prior to stacking, as discussed in greater detail below.

The image forming device 104 may then deposit a pattern of an adhering agent (e.g., fluid 126) in image-wise fashion at precise locations onto the substrate material 118. The fluid 126 is selectively deposited on the substrate material 118 so that some parts of the material are covered with liquid as a positive image of a slice of a 3d object, and some parts of the material are not. The pattern of fluid 126 may be deposited via a variety of approaches. For example, the image forming device 104 may include a thermal inkjet head or a piezoelectric inkjet head to dispense the fluid. In examples, the image forming device 104 may apply air pressure to dispense the fluid 126. The image forming device 104 may also include a solenoid valve if air pressure is used to control the release of air or dispensing of fluid.

In some cases, the fluid adhering agent that is selectively deposited may be water or an aqueous solution that includes a material that slows the evaporation of water. For example, the aqueous solution may include 2-pyrrolidinone. In other cases, a different fluid, such as an alcohol may be selectively deposited as the adhering agent. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the substrate material or sheet thereof via interaction with the fluid adhering agent to form a polymer image on the substrate material, but does not adhere to portions of the substrate material that are not covered with the fluid.

In typical application, the powder applicator 128 may include a trough containing the powder. The trough may have a slitted opening on its underside and is connected to an electromechanical vibrator of the powder subsystem. The vibrator, when active, causes the powder to flow downward through the slitted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite or ferric oxide (FeO), may be used for the toner powder in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer.

Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate material 118, while powder applied to the printed areas remain as the polymer image. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder subsystem 106 can be set to run continuously so that, once the substrate material 118 passes the image forming device 104, the substrate automatically travels through the powder subsystem 106. Alternatively, the controller 150 in communication with the transfer subsystem 114, the image forming device and the powder subsystem 106 can instruct the powder applicator 128 and powder remover 130 or subsystems thereof to turn on and off at the appropriate times.

After the substrate 118 has had powder applied and excess powder removed, the remaining patterned powder may be melted, at least partially cured or pinned onto the substrate so that the powdered polymer image more permanently affixes to the printed areas of the substrate and is thus protected from displacement, disruption, or falling off during subsequent processing steps. To this end, an optional fuser 108 may be disposed after the powder subsystem 106. The fuser 108 may be disposed above, below, or adjacent to the substrate leading out of the powder remover 130. The fuser 108 may be, for example but not limited to, radiant, IR, or other heating approach sufficient to at least partially cure or pin and thereby fix the patterned powder to the substrate. As the substrate 118 travels out of the powder subsystem 106, the heat from the fuser 108 stabilizes the patterned powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate material is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the roll 102 of substrate material 118 is mounted and situated ahead of the image forming device 104. While not being limited to a particular theory, the web of substrate material 118 can extend through all of the components of the AM system, including the image forming device 104, the powder subsystem 106, the fuser 108, the sensor 110, and then be cut by the cutter 112 into single sheets 132 prior to stacking, with the sheets corresponding to a layer of a 3D object. In examples, the web of substrate material 118 may be cut by the cutter 112 into single sheets 132 at any prior point in the process. For example, the web may be converted to a single sheet prior to advancing the resulting substrate sheet to the image forming device 104. Likewise, the web may be converted to a single sheet after the image forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

Next in an exemplary AM process of forming a 3D object, the powder printed substrate sheets 132 may be stacked by aligning the substrate sheets via their registration apertures, and fused together to attach the stacked substrate sheets into the combined object. Then the uncoated substrate material may be removed from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven (not shown). Heat from the oven causes the thermoplastic powder to melt. The molten material coats the substrate layers. The compressive device 140, with the substrate stack 138 in it, is then removed from the oven, and the substrate layers are allowed to cool. The molten material then solidifies. As it does so, it binds (fuses) the substrate sheets 132 together. Excess substrate (that has not been covered by the solidified material) is then removed as noted above by, for example, abrasive blasting, chemical removal or dissolution to result in a 3D printed object.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image forming device 104, powder subsystem 106, fuser 108, sensor 110, cutter 112, transfer subsystem 114, punching device 134 and stacker subsystem 116 may operate as discussed herein based on input from the controllers. Thus while the controller 150 is shown in communication with the image forming device 104, it is understood that the controller may be in communication with any component of the AM system.

Figure 2:
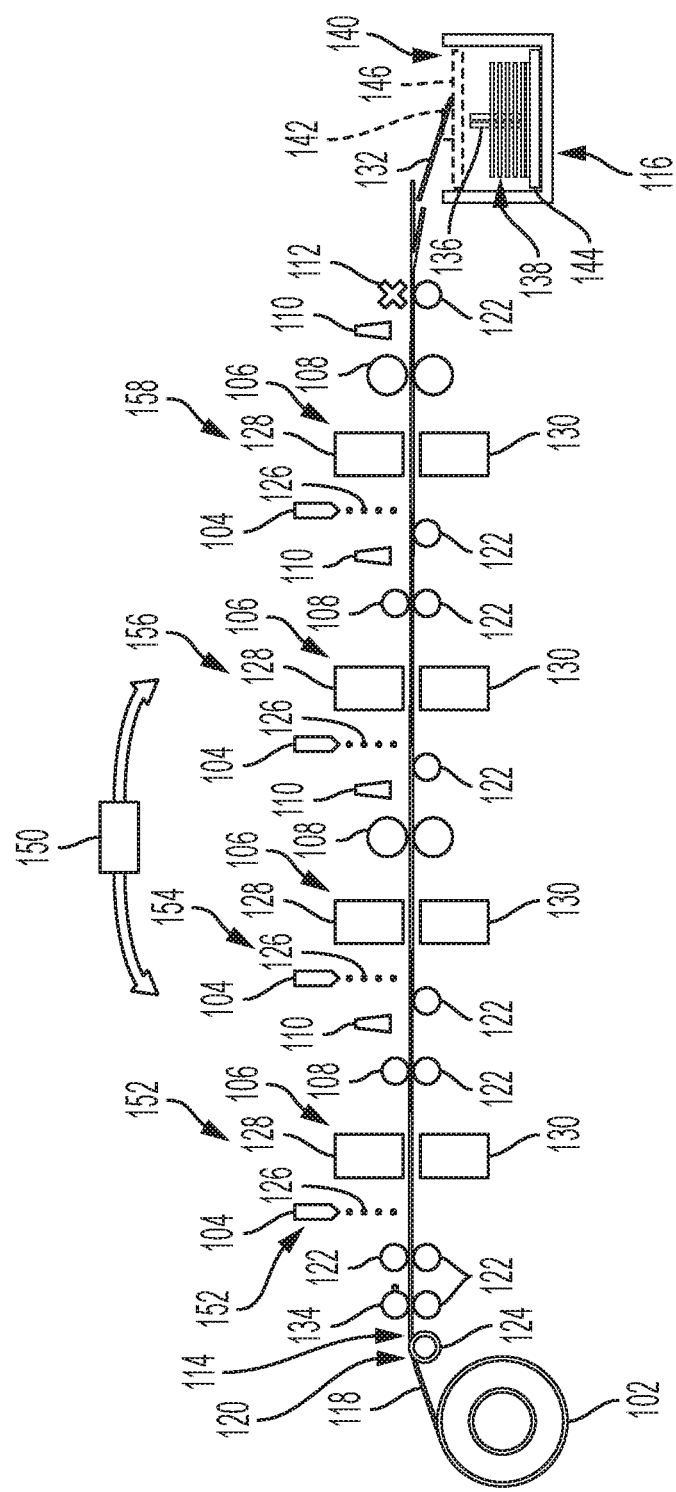
FIG. 2 is a side view of a printing system for fabricating halftone colored additive manufactured composite structures in accordance with an example.

FIG. 2 depicts an improvement to the AM system described above that uses an AM system 200 for fabricating halftone colored additive manufactured composite structures. In the AM system 200, the substrate material may be a carbon fiber or other fibrous substrate that is light in color, or white. The AM system 200 uses polymer powders that may be colored during the manufacturing process of the polymer as readily understood by a skilled artisan, and therefore is colored throughout the powder pellets. For example, a first color additive manufacturing device 152 may include the image forming device 104 and the powder subsystem 106. Polymer powder applied by the powder applicator 128 may be a given color (e.g., Pantone, white) applied onto an imaging area of the substrate material 118 that adheres to an adhering agent halftone pattern of fluid 126 deposited by the image forming device 104 to produce a halftone color image that may be distinguishable from other additive manufacturing produced objects. Like referenced numerals discussed above in reference to the AM system 100 designate similar or identical elements in the AM system 200.

The AM system 200 may add additional color additive manufacturing devices downstream the first color additive manufacturing device 152 that provide other halftone color images that may be combined to make multi-colored printed layers for a 3D object. Unless otherwise noted, the additional color additive manufacturing devices are similar to the first color additive manufacturing device 152, and are each intentionally designed to deposit a polymer sub-layer different than the first color additive manufacturing device in color or some other quality. The sub-layers added by each color additive manufacturing device are combined into a multi-color layer image on the substrate material, that may be cut as a printed substrate sheet 132.

While not being limited to a particular theory or quantity, the AM system 200 may include second, third and fourth color additive manufacturing devices 154, 156, 158, with each having a respective image forming device 104 and powder subsystem 106. Each of the respective image forming devices 104 is configured to selectively depositing a dyeless adhering agent in a respective pattern onto an imaging area of the substrate material 118. The adhering agent may be a dyeless or colorless liquid, and may be designed to cause no discoloration of the substrate material 118, or any powder or polymer image on the substrate material. The pattern of fluid 126 selectively deposited by each respective image forming device 102 may be a halftone pattern. The adhering agent deposited by each image forming device may be the same material. Accordingly, in some cases the fluid adhering agent that is selectively deposited may be water or an aqueous solution that includes a material that slows the evaporation of water. For example, the aqueous solution may include 2-pyrrolidinone. In other cases, a different fluid, such as an alcohol may be selectively deposited as the adhering agent. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it may be helpful to apply a surface energy modifier or repellent to the substrate before selectively depositing the liquid fluid. The composition of the fluids 126 may also depend on the type (e.g., color, magnetic properties, pearlescence) of polymer powder subsequently applied to the substrate material 118.

Each of the respective powder subsystems 106 includes a powder applicator 128 and powder remover 130. Each powder applicator 128 may store and apply a respective powder having a different color or other property. For example, each of the powder applicators may apply one of four component colors (cyan, magenta, yellow and black—"CMYK"). Any of the powder applicators or additional powder applicators may apply different types of powder (e.g., magnetic powder, fluorescent powder) or other color powders including white. The powder is configured to adhere to the areas of the substrate material that have been made wet by the adhering agent fluid deposited by the respective image forming device of the color additive manufacturing device. The powder sticks to the printed (wet) areas on the substrate material or sheet thereof via interaction with the adhering agent to form an additional color image sub-layer on the substrate material, but does not adhere to portions of the substrate material that are not covered with the respective adhering agent fluid.

Each powder applicator 128 may include a trough, which contains a respective (e.g., color) polymer powder. The trough may have a slitted opening on its underside and is connected to an electromechanical vibrator of the powder subsystem. The vibrator, when active, may cause the respective polymer powder to flow downward through the slitted opening and out of the trough onto the substrate material while it moves under the trough. The vibrator may be actuated by the controller 150. When the respective patterned fluid has completely passed, the vibrator may deactivate to cease the respective polymer powder flow from the trough. The powder may also be selectively deposited by other approaches as discussed above or otherwise understood by a skilled artisan.

Still referring to FIG. 2, the powder applicator 128 from the first color additive manufacturing device 152 may store and apply a first colored polymer powder (e.g., cyan) via flooding the powder onto an imaging area of the substrate material 118, with the applied first colored powder mixing with the patterned adhering agent deposited by the image forming device 104 of the first color additive manufacturing device to form a first colored image (e.g., cyan) on the substrate material. The first colored image may be a halftone image matching a halftone image patterned by the image forming device 104 of the first color additive manufacturing device 152. Excess first colored powder that does not attach to or mix with the adhering agent may be removed by the powder remover 130 of the first color additive manufacturing device. In typical application, each respective powder remover 130 may include a vacuum having a vacuum motor coupled to a cyclone. In operation, the vacuum pulls the respective powder that does not adhere to the substrate material 118 via interaction with the respective adhering agent fluid 126, while the polymer powder applied onto the printed adhering agent remain as the respective polymer image. The cyclone may recirculate the vacuumed powder back to the respective powder applicator for reuse, as well understood by a skilled artisan. Each powder remover 130 may also include an air knife after the vacuum to remove any remaining excess powder from the substrate material.

Each powder subsystem 106 can be set to run continuously so that, once the substrate material 118 passes the associated image forming device 104 of the respective color additive manufacturing device, the substrate material automatically travels through the associated powder subsystem. Alternatively, the controller 150 can instruct the associated powder applicator 128 and powder remover 130 or subsystems thereof to turn on and off at the appropriate times.

A fuser 108 may be proximate and downstream the first color additive manufacturing device powder subsystem 106 to at least partially cure or pin the first colored image.

The substrate material 118 may continue to the second color additive manufacturing device 154, which has an image forming device 104 configured to selectively depositing a second adhering agent in a desired second pattern onto the imaging area and the first halftone color image. The powder applicator 128 of the second color additive manufacturing device 154 may store and apply a second colored polymer powder (e.g., magenta) via flooding the powder onto the imaging area, which here may include the first colored image (e.g., cyan) and the second adhering agent. The second colored polymer powder contacting the second adhering agent may mix or combine with the adhering agent to form a second colored image (e.g., magenta) at the imaging area of the substrate material. The powder remover 130 of the second color additive manufacturing device 154 may remove excess second colored polymer powder from the substrate material, with the excess second colored polymer powder being the powder on the substrate material that does not contact the second adhering agent. A second color image (e.g., magenta) remains at the imaging area with the first color image. The second colored image may be a halftone image matching a halftone image patterned by the image forming device of the second color additive manufacturing device 154. A second fuser 108 may be proximate and downstream the second color additive manufacturing device powder subsystem 106 to at least partially cure or pin the second colored image.

The substrate material 118 may continue to the third color additive manufacturing device 156 and to the fourth color additive manufacturing device 158, to receive a third color image (e.g., yellow) and a fourth color image (e.g., black), respectively, in a similar manner as discussed above for the first and second color additive manufacturing devices. Each colored image may add a sub-layer of the specific color of the respective powder to the imaging area in halftone format, which together may yield a combined color image layer at the imaging area having the desired dot-on-dot halftone "CMYK" powders necessary to produce desired colors for the printed substrate material. By varying the density of the four printing colors, cyan, magenta, yellow and black, any particular shade can be reproduced. The printed substrate material may be cut by the cutter 112 into a printed substrate sheet 132 and forwarded for stacking and further processing. The color additive manufacturing devices 152, 154, 156, 158 may repeat adding color images to additional printed substrate sheets 132 that may be stacked and further processed (e.g., heat, compression, cleaning) to yield a colored 3D object.

Fusers 108 may be located adjacent and downstream each of the color additive manufacturing devices 152, 154, 156, 158 to at least partially cure or pin the respective image most recently applied to the imaging area of the substrate material sufficient to give the image enough stability so that it is not disturbed by subsequent processing. The respective fuser 108 may be disposed above, below, or adjacent to the substrate material leading out of the associated powder remover 130. Each fuser 108 is shown as a heat/pressure roller, but is not limited to any particular structure. For example, the fuser may also be a hot plate press, a high intensity light emitter, an electromagnetic radiation emitter, or another fusing device sufficient to at least partially cure or pin and thereby fix the respective patterned polymer powder image to the substrate material sufficient to give the image enough stability so that it is not disturbed by subsequent processing. In other words, the use of fusers after each color sub-layer to pin the color sub-layer to the substrate material prevents unwanted migration of colored powder from previously applied sub-layers. The intermediate pinning of color sub-layers also reduces undesired color mixing and increases the likelihood of reclaiming excess powder. Further the stabilizing of each polymer image sub-layer may increase a bond between portions of the polymer images that are in contact with other sub-layers of the image.

Figure 3:
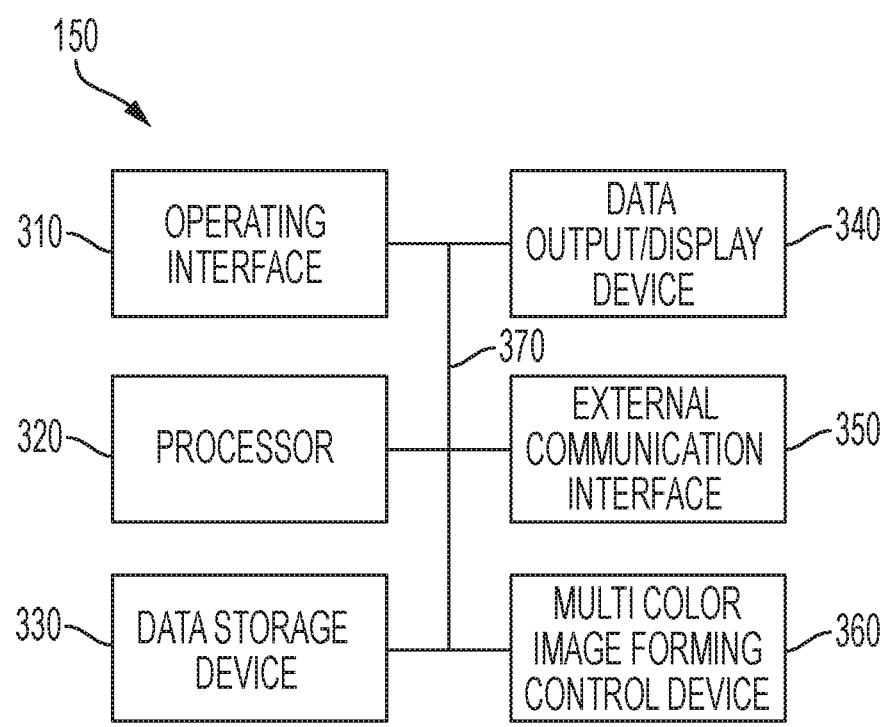
FIG. 3 illustrates a block diagram of an exemplary control system for implementing a halftone colored additive manufacturing scheme.

FIG. 3 illustrates a block diagram of the controller 150 for executing instructions to automatically control exemplary devices in the AM systems depicted in FIGS. 1 and 2. The exemplary controller 150 may provide input, to or be a component of a controller for executing the multi-color AM process in a system such as that depicted in FIG. 2 and described in greater detail below in FIG. 4.

The exemplary control system 150 may include an operating interface 310 by which a user may communicate with the exemplary control system 150. The operating interface 310 may be a locally-accessible user interface associated with the AM 3D object forming system 200. The operating interface 310 may be configured as one or more conventional mechanism common to control devices and/or computing devices that may permit a user to input information to the exemplary control system 150. The operating interface 310 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 310 may be a part or a function of a graphical user interface (GUI) mounted on, integral to, or associated with, the AM system with which the exemplary control system 150 is associated.

The exemplary control system 150 may include one or more local processors 320 for individually operating the exemplary control system 150 and for carrying into effect control and operating functions for AM 3D multi-color object forming, and specifically for implementing multi-color composite-based layer forming schemes. Processor(s) 320 may include at least one conventional processor or microprocessor that interpret and execute instructions to direct specific functioning of the exemplary control system 150, and control of the multi-color AM 3D object forming process with the exemplary control system 150.

The exemplary control system 150 may include one or more data storage devices 330. Such data storage device(s) 330 may be used to store data or operating programs to be used by the exemplary control system 150, and specifically the processor(s) 320. Data storage device(s) 330 may be used to store information regarding, for example, one or more 3D object models for producing multi-color 3D objects in an AM system with which the exemplary control system 150 is associated. Stored 3D object model information may be devolved into data for the printing of a series of layers of multi-color 2D slices for forming the 3D object in the manner generally described above.

The data storage device(s) 330 may include a random access memory (RAM) or another type of dynamic storage device that is capable of storing updatable database information, and for separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary control system 150, or may be provided external to, and in wired or wireless communication with, the exemplary control system 150, including as cloud-based data storage components.

The exemplary control system 150 may include at least one data output/display device 340, which may be configured as one or more conventional mechanism that output information to a user, including, but not limited to, a display screen on a GUI of the AM system 200 with which the exemplary control system 150 may be associated. The data output/display device 340 may be used to indicate to a user a status of a multi-color 3D object forming operation effected by the AM system with which the exemplary control system 150 may be associated including an operation of one or more individually controlled components at one or more of a plurality of separate processing stations or subsystems in the device.

The exemplary control system 150 may include one or more separate external communication interfaces 350 by which the exemplary control system 150 may communicate with components that may be external to the exemplary control system. At least one of the external communication interfaces 350 may be configured as an input port to support connecting an external CAD/CAM device storing modeling information for execution of the control functions in the 3D object forming operations. Any suitable data connection to provide wired or wireless communication between the exemplary control system 150 and external and/or associated components is contemplated to be encompassed by the depicted external communication interface 350.

The exemplary control system 150 may include a multi-color image forming control device 360 that may be used to control the image forming process on the substrate material 118 (e.g., image forming devices 104, powder subsystems 106, fusesr 108, color additive manufacturing devices) that produces the series of multi-color 2D slices (e.g., printed substrate sheets 132) for the in-process multi-color 3D object according to devolved 3D object modeling information. The substrate material 118 may be fed through the color additive manufacturing devices 152, 154, 156, 158 to have the multi-color image layers formed thereon under the control of the multi-color image forming control device 360. The substrate material may exit the color additive manufacturing devices as a printed substrate web and be cut and automatically stacked at an output side of the AM system 200 in order to constitute a stack 138 of the printed sheets for forming a multi-color composite object. The multi-color image forming control device 360 may operate as a part or a function of the processor 320 coupled to one or more of the data storage devices 330, or may operate as a separate stand-alone component module or circuit in the exemplary control system 150. Either of the processor 320 or the multi-color image forming control device 360 may parse the input 3D object model information to determine and execute a layer-by-layer 2D slice multi-color material layer printing scheme on the substrate material 118 in the AM system 200.

The exemplary control system 150 may include a 3D composite object finisher control device (not shown) for executing a final 3D object shaping scheme on a processed stack of cut printed sheet slices in a subtractive machining process that may remove the layered support component structure and surface finish the 3D object. As with the above-enumerated other separate control devices, the 3D composite object finisher control device may operate as a part or a function of the processor 320 coupled to one or more data storage devices 330 for executing finishing device operations, or may operate as a separate stand-alone component module or circuit in the exemplary control system 150.

All of the various components of the exemplary control system 150, as depicted in FIG. 3, may be connected internally, and to one or more AM multi-color composite object forming devices and/or components thereof, by one or more data/control busses 370. These data/control busses 370 may provide wired or wireless communication between the various components of the exemplary control system 150, whether all of those components are housed integrally in, or are otherwise external and connected to an AM system 200 with which the exemplary control system 150 may be associated.

It should be appreciated that, although depicted in FIG. 3 as an integral unit, the various disclosed elements of the exemplary control system 150 may be arranged in any combination of sub-systems as individual components or combinations of components, integral to a single unit, or external to, and in wired or wireless communication with the single unit of the exemplary control system. In other words, no specific configuration as an integral unit or as a support unit is to be implied by the depiction in FIG. 3. Further, although depicted as individual units for ease of understanding of the details provided in this disclosure regarding the exemplary control system 150, it should be understood that the described functions of any of the individually-depicted components, and particularly each of the depicted control devices, may be undertaken, for example, by one or more processors 320 connected to, and in communication with, one or more data storage device(s) 330.

Figure 4:
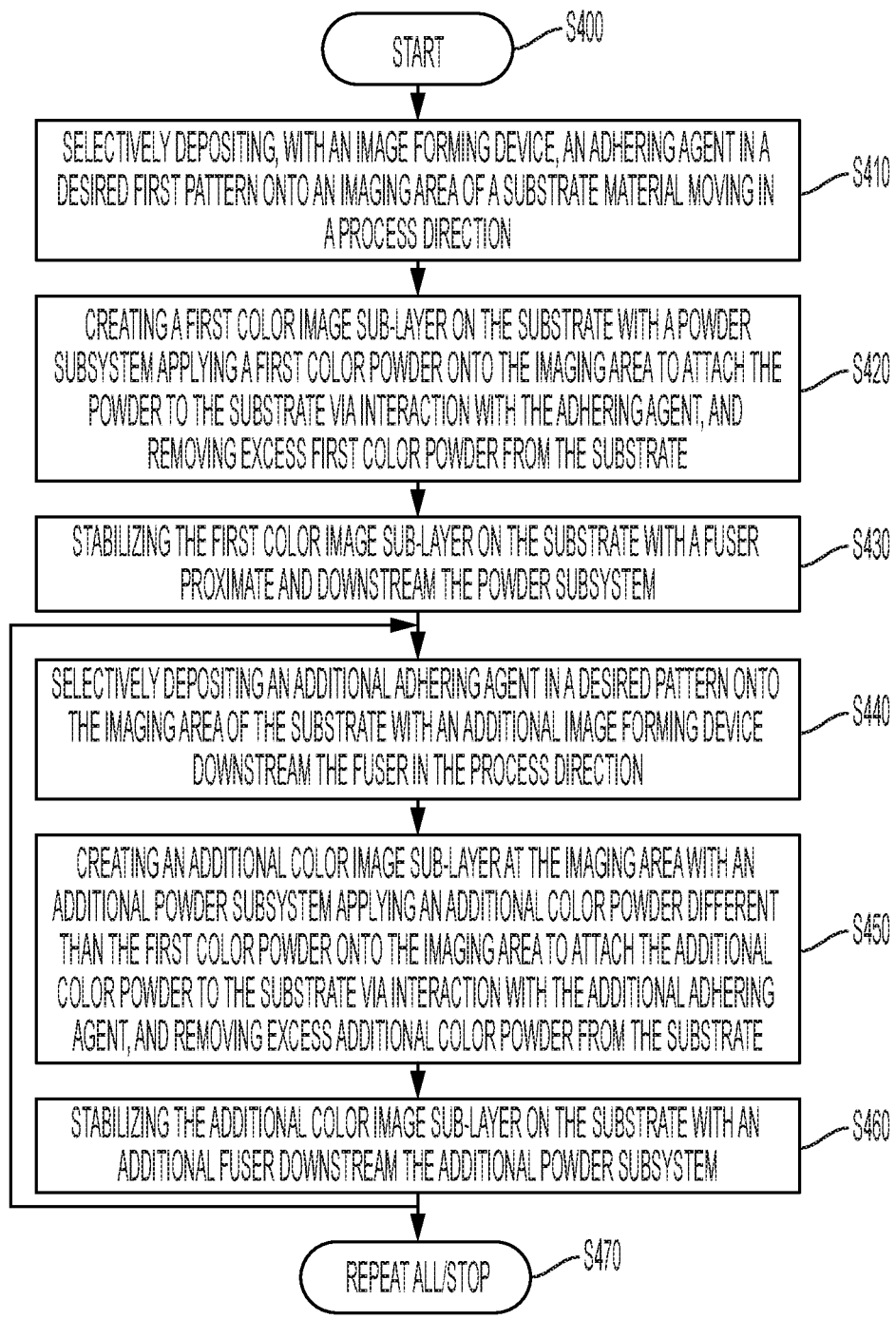
FIG. 4 is a flowchart depicting the operation of an exemplary method for fabricating halftone colored additive manufactured composite structures in accordance with an example of the embodiments.

The disclosed embodiments may include an exemplary method for fabricating a multi-color additive manufactured composite structure. FIG. 4 illustrates a flowchart of such an exemplary method. As shown in FIG. 4, operation of the method commences at Step S400 and proceeds to Step S410.

At Step S410, an image forming device selectively deposits an adhering agent in a desired first pattern onto an imaging area of a substrate material moving in a process direction. The desired first pattern may be a halftone image. The substrate material may move in the process direction with help from a transfer subsystem, which may include a tensioning mechanism together with feed rollers used to hold and advance the substrate material. Operation of the method proceeds to Step S420.

At Step S420 a powder subsystem creates a first color image as a first color polymer sub-layer on the imaging area of the substrate material. In particular, a powder applicator of the powder subsystem floods a first color powder onto the imaging area to attach the powder to the substrate via interaction with the fluid adhering agent. The first color powder sticks to the adhering agent at the imaging area to form the first color image on the substrate material, but does not adhere to portions of the imaging area that are not covered with the fluid. The first color image may be a fluid combination of the first color powder and the adhering agent, or the powder in a state where it attaches to the substrate with the powder being altered by the adhering agent. Then a powder remover removes excess first color powder from the substrate. The excess first color powder is the powder that does not stick to the substrate via the adhering agent. This excess powder is removed, for example by vacuuming the excess powder by the powder remover or turning the substrate over with the excess powder falling off the substrate via gravity. After removal of the excess powder, the first color polymer sub-layer remains representing the first color image. The first color image may be in a halftone format.

Operation of the method proceeds to Step S430, where the first color image sub-layer is stabilized on the substrate. For example, a fuser downstream the powder subsystem may at least partially cure the first color image onto the substrate so that the first color image sub-layer more permanently affixes to the printed areas of the substrate and is also protected from displacement, disruption, or falling off during subsequent processing. Operation of the method proceeds to Step S440.

At Step S440, an additional image forming device downstream the fuser in the process direction selectively deposits an additional adhering agent in a desired additional pattern onto the imaging area of the substrate. The additional adhering agent is selectively deposited on the imaging area so that some parts of the imaging area are covered with the additional adhering agent as a positive additional image sub-layer of a slice of a 3d object. The second adhering agent may be the same material as the adhering agent applied by the image forming device, or a different material. The desired additional pattern may be a halftone image, and may cover at least some of the first color image or any additional color image located in the imaging area of the substrate material.

Operation of the method shown in FIG. 4 proceeds to Steps S450, where an additional powder subsystem creates an additional color image as an additional color sub-layer on the imaging area of the substrate material. In particular, an additional powder applicator of the additional powder subsystem applies an additional color powder different than the first color powder onto the imaging area to attach the additional color powder to the imaging area via interaction with the additional adhering agent. The additional color powder sticks to the additional adhering agent at the imaging area to form the additional color image on the substrate, but does not adhere to portions of the imaging area that are not covered with the additional adhering agent fluid. The additional color image may be a fluid combination of the second powder and second adhering agent, or the second powder in a state where it attaches to the substrate with the powder being altered by the additional adhering agent. Then an additional powder remover of the additional powder subsystem removes excess additional color powder from the substrate. The excess powder is the additional color powder that does not stick to the substrate via the additional adhering agent. This excess additional color powder is removed, for example by vacuuming the excess powder by the additional powder remover or turning the substrate over with the excess powder falling off the substrate via gravity. After removal of the excess additional color powder, the first color image sub-layer and the additional color image sub-layer remain as parts of the aggregate color image layer, with the additional color image sub-layer representing the additional color image. The additional color image may also be in a halftone format.

Operation of the method proceeds to Step S460, where the additional color image is stabilized on the substrate material. For example, an additional fuser downstream the additional powder subsystem may at least partially cure the additional color image onto the substrate material so that the additional color image more permanently affixes to the imaging area of the substrate material and is also protected from displacement, disruption, or falling off during subsequent processing. The additional fuser may also further cure the first color image and any additional color images. Operation of the method may then continue back to Step S440 to apply another additional color image as an additional color image sub-layer at the imaging area with all the respective additional color image sub-layers combining with the first color image sub layer at the imaging area to form an aggregate multi-color image layer for the respective substrate sheet having the imaging area. Alternatively, operation of the method may repeat back to Step S410 to fabricate another multi-color image printed sheet, or cease at Step S470 to allow further processing of the multi-color image printed sheets.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4 and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to AM systems in many different configurations. For example, although single-pass marking material deposition is shown in the discussed embodiments, the examples may apply to multi-pass systems and methods, including 3d object forming systems and methods. Also, while single-side printing is shown in the discussed embodiments, the examples may apply to multi-sided multi-color additive manufacturing printing. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A printing system for fabricating halftone colored additive manufactured composite structures, comprising:
    a substrate material being forwarded through the printing system in a process direction;
    a first color powder;
    a first color additive manufacturing device adjacent to the substrate material, the first color additive manufacturing device configured to deposit a first halftone color image in a desired first halftone pattern onto an imaging area of the substrate material, the first color additive manufacturing device including:
        a first image forming device for selectively depositing a first adhering agent in the desired first halftone pattern onto the imaging area of the substrate material,
        a first color powder applicator configured to apply the first color powder onto the imaging area and the first adhering agent, wherein the first color powder attaches to the substrate material via interaction with the first adhering agent, and
        a first color powder remover configured to remove any of the applied first color powder that does not attach to the substrate material resulting in the first halftone color image on the imaging area;
    a second color powder being different than the first color powder; and
    a second color additive manufacturing device downstream the first color additive manufacturing device in the process direction, the second color additive manufacturing device configured to deposit a second halftone color image different than the first halftone color image in a desired second halftone pattern onto the imaging area of the first halftone color image, the second color additive manufacturing device including:
        a second image forming device for selectively depositing a second adhering agent in the desired second halftone pattern onto the imaging area and the first halftone color image,
        a second color powder applicator configured to apply the second color powder onto the imaging area and the second adhering agent, wherein the second color powder attaches to the substrate material via interaction with the second adhering agent, and
        a second color powder remover configured to remove any of the applied second color powder that does not attach to the substrate material, resulting in the second halftone color image pattern on the imaging area,
    wherein one of the halftone colored additive manufactured composite structures includes the substrate material with the first halftone color image and the second halftone color image printed thereon as an aggregate halftone color image at the imaging area.

2. The system of claim 1, further comprising a fuser positioned downstream the second color powder remover in the process direction to at least partially cure the second halftone color image sufficient to stabilize the second halftone color image with the first halftone color image on the substrate material as a pinned second halftone color image.

3. The system of claim 1, further comprising a fuser positioned after each of the first color additive manufacturing device and the second color additive manufacturing device in the process direction, each fuser configured to at least partially cure the respective halftone color image added by the respective color additive manufacturing device sufficient to stabilize the respective halftone color image with any previously added halftone color image on the imaging area of the substrate material.

4. The system of claim 3, wherein the fuser includes a hot plate press.

5. The system of claim 3, wherein the fuser includes a pinning lamp.

6. The system of claim 3, wherein the fuser includes a heat roller.

7. The system of claim 1, further comprising a fuser between the first color additive manufacturing device and the second color additive manufacturing device to at least partially cure the first halftone color image sufficient to stabilize the first halftone color image on the substrate material as a pinned first halftone color image that is not disturbed by processing by the second color additive manufacturing device.

8. The system of claim 1, further comprising a controller in communication with at least one of the first color additive manufacturing device, and the second color additive manufacturing device to output control signals to control an operation of the at least one of the additive manufacturing devices in communication therewith.

9. The system of claim 1, wherein the first adhering agent and the second adhering agent are dyeless fluids.

10. A method for fabricating halftone colored additive manufactured composite structures using a printing system, the printing system including a substrate material having an imaging area, a first color powder, a first color additive manufacturing device adjacent to the substrate material, a second color powder being different than the first color powder, and a second color additive manufacturing device downstream the first color additive manufacturing device in the process direction, the second color additive manufacturing device including a second image forming device, a second color powder applicator, and a second color powder remover, the method, comprising:
    a) forwarding the substrate material through the printing system in a process direction;
    b) selectively depositing the first halftone color image in the desired first halftone pattern onto the imaging area of the substrate material with the first color additive manufacturing device adjacent to the substrate material, the step b) further including:
        selectively depositing a first adhering agent in the desired first halftone pattern onto an imaging area of the substrate material with a first image forming device,
        applying a first color powder onto the imaging area via a first color powder applicator to attach the first color powder to the substrate material via interaction with the first adhering agent, and
        removing any of the applied first color powder that does not attach to the substrate material with a first color powder remover, the removing resulting in the first halftone color image on the substrate material; and
    c) selectively depositing the second halftone color image different than the first halftone color image in a desired second halftone pattern onto the imaging area and the first halftone color image with a second color additive manufacturing device downstream the first color additive manufacturing device in the process direction, the step c) further including:
- selectively depositing a second adhering agent in the desired second halftone pattern onto the imaging area and the first halftone color image with a second image forming device downstream the first color powder remover in the process direction,
- applying a second color powder onto the imaging area with a second color powder applicator to attach the second color powder to the substrate material via interaction with the second adhering agent, the second color powder being different than the first color powder, and
- removing any of the applied second color powder that does not attach to the substrate material with a second color powder remover, the removing resulting in the second halftone color image on the imaging area,
- wherein one of the halftone colored additive manufactured composite structures includes the substrate material with the first halftone color image and the second halftone color image deposited thereon forming an aggregate halftone color image at the imaging area.

11. The method of claim 10, further comprising curing the first halftone color image with a fuser between the first color additive manufacturing device and the second color additive manufacturing device, the fusing sufficient to stabilize the first halftone color image on the substrate material as a pinned first halftone color image that is not disturbed by processing by the second color additive manufacturing device.

12. The method of claim 10, further comprising curing the second halftone color image with a fuser positioned downstream the second color additive manufacturing device in the process direction, the fusing sufficient to stabilize the second halftone color image with the first halftone color image on the substrate material as a pinned second halftone color image.

13. The method of claim 10, further comprising curing the respective halftone color image added by the respective color additive manufacturing device with a fuser positioned after each of the first color additive manufacturing device and the second color additive manufacturing device in the process direction, the fusing sufficient to stabilize the respective halftone color image with any previously added halftone color image on the imaging area of the substrate material.

14. The method of claim 10, further comprising cutting the substrate material with a cutting device into substrate sheets corresponding to a layer of a 3D object.

15. The method of claim 14, further comprising stacking the cut substrate sheets with a stacker subsystem and aligning the stacked substrate sheets with an alignment mechanism.

16. The method of claim 10, wherein the first adhering agent and the second adhering agent are dyeless fluids.

17. The method of claim 10, further comprising outputting control signals from a controller to control an operation of at least one of the first color additive manufacturing device and the second color additive manufacturing device.

18. A printing system for fabricating halftone colored additive manufactured composite structures, comprising:
- a substrate material being forwarded through the printing system in a process direction;
- a plurality of color additive manufacturing devices located in serial succession adjacent to the substrate material, each of the plurality of color additive manufacturing devices including
  - a respective color powder unique for each color additive manufacturing device,
  - an image forming device for selectively depositing a dyeless adhering agent in a respective halftone pattern onto an imaging area of the substrate material,
  - a color powder applicator configured to apply the respective color powder onto the substrate material and the adhering agent, wherein the respective color powder attaches to the substrate material via interaction with the adhering agent, the respective color powder applied by each of the color powder applicators having a different color, and
  - a powder remover configured to remove any of the applied respective color powder that does not attach to the substrate material leaving a halftone polymer image of the respective color on the substrate material;
- a fuser positioned after each of the plurality of color additive manufacturing devices in the process direction, each fuser configured to at least partially cure the respective color halftone polymer image added by the preceding color additive manufacturing device sufficient to stabilize the respective color halftone polymer image with any previously added color halftone polymer image on the imaging area of the substrate material; and
- a controller in communication with each of the plurality of color additive manufacturing devices to output control signals to control an operation of the respective color additive manufacturing devices,
- the substrate material being printed with the color polymer images to form an aggregate halftone color image at the imaging area.

* * * * *